E. STEINBUCH AND P. SCHETELIG.
PROCESS FOR THE MANUFACTURE OF ACETALDEHYDE.
APPLICATION FILED SEPT. 25, 1918.
1,319,365.
Patented Oct. 21, 1919.
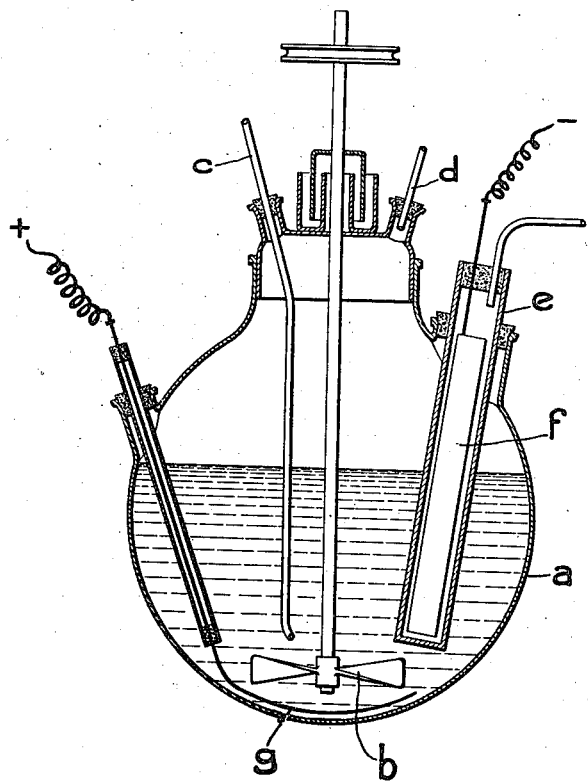
Inventors
Ewald Steinbuch & Paul Schetelig
by Laurence Langner
Atty.

UNITED STATES PATENT OFFICE.

EWALD STEINBUCH AND PAUL SCHETELIG, OF BASEL, SWITZERLAND, ASSIGNORS TO SOCIETY OF CHEMICAL INDUSTRY IN BASLE, OF BASEL, SWITZERLAND.

PROCESS FOR THE MANUFACTURE OF ACETALDEHYDE.

1,319,365.      Specification of Letters Patent.      Patented Oct. 21, 1919.

Application filed September 25, 1918. Serial No. 255,671.

*To all whom it may concern:*

Be it known that we, EWALD STEINBUCH and PAUL SCHETELIG, both citizens of the Swiss Republic, and residents of Basel, Switzerland, have invented a new and useful Process for the Manufacture of Acetaldehyde, of which the following is a full, clear, and exact specification.

In the preparation of acetaldehyde from acetylene with the aid of dilute acids containing mercury compounds, it occurs that the efficiency of the mercury catalyst relaxes quickly and ceases nearly completely after a relatively short time. Thus when, for instance, acetylene is introduced into a reaction liquid heated to 70–80° C. and composed of 1 liter sulfuric acid of 10 per cent. and 10 gr. of mercury oxid, there will be almost no further formation of aldehyde after about 50 liters of acetylene have been transformed into aldehyde: the mercury catalyst has then been transformed into a gray slime often mixed with mercury drops and has no further action.

In order to obtain a continuous production of aldehyde, the mercury catalyst must be regenerated during the process. Hitherto this object has not been attained in a satisfactory manner. It has been proposed to add continuously to the liquid in which the reaction proceeds, small proportions of oxidants, such as ferric salts, manganesic salts or chromic acid. In this manner the process may, indeed, be prolonged, but it comparatively soon happens that it must be interrupted since the liquid contains too much of the added foreign substance and must be renewed.

We have now found a process allowing to continue the introduction of acetylene and its transformation into aldehyde as much as for an unlimited time. It is based on the utilization of the oxidizing action of the electric current for transforming the mercury, produced by reduction in the course of the process, continuously again into the active catalyst. For this purpose we dispose into the vessel, wherein the reaction is to proceed one or several cathodes advantageously placed in one or several diaphragm-cells and one or several anodes suitable for use in an acid electrolyte and we convey by means of both the electrodes or both the series of electrodes through the reaction liquid a limited continuous current which is advantageously confined to about one ampere-hour for about every 25 or more liters of acetylene introduced per hour. Metallic mercury, which comes into conductive contact with the anode, will be transformed immediately into the active catalyst. In order to convert the mercury or mercury slime, suspended in the reaction liquid or whirled up in the same, into the active form, there is added at the anode a small quantity of at least one substance capable of passing to a higher degree of oxidation as, for instance, a ferrous salt, a cerous salt, a manganous salt or a chromous salt, serving as oxygen transmitter during the passing of the electric current. Thus the catalyst will be regenerated continuously and the production of aldehyde will be a continuous one.

In the following we shall describe an example of carrying out the new process with reference to the accompanying drawing showing a vertical sectional view of the apparatus used thereby.

*Example.*

Into a retort of about 2 liters provided with a stirrer $b$, a pipe $c$ for the introduction of acetylene, and a pipe $d$ for the escapement of aldehyde, is disposed a diaphragm-cell $e$ provided with a copper cathode $f$. Close to the bottom of the retort is placed a platinum electrode $g$ of about 20 $cm^2$ active surface. The charge of the retort consists of 1 liter of sulfuric acid of 10 per cent., 21.6 gr. of mercuric oxid and 27.8 gr. of crystallized ferrosulfate and is maintained at a temperature of 75 to 80° C. The air is driven out of the retort by means of acetylene, the stirrer is set in function and the introduction of acetylene is continued. Simultaneously a direct electric current of an intensity of 1 ampere is continuously passed through the reaction liquid. Thus it becomes possible to transform with the indicated small quantity of mercury as much as unlimited quantities of acetylene into acetaldehyde in a continuous manner and with very good yields, whereby the absorption of acetylene per hour will be of about 40 liters and more. Instead of adding mercuric oxid or another mercury compound into the reaction liquid, some metallic mercury may be placed on the anode, which can also be made of another substance than platinum, the said metallic mercury forming a part of the anode beginning immediately to be transformed into the active mercury compound after the passage of current takes place.

The anodes can also be suspended from the top or in any other manner into the reaction liquid. In this case it can be advantageous to adapt an auxiliary anode at the place where metallic mercury will be accumulated. The stirrer can also be used as anode and be provided, if desired, with catchers for the metallic mercury formed during the process or an auxiliary anode may also be employed.

Instead of dilute sulfuric acid also another acid as for instance phosphoric acid may form the reaction liquid.

What we claim is:

1. In the manufacture of acetaldehyde from acetylene with aid of dilute acids containing a mercury compound, the method of regenerating the mercury catalyst in the reaction liquid by the oxidizing action of a relatively limited electric current.

2. In the manufacture of acetaldehyde from acetylene with aid of dilute acids containing a mercury compound, the method of regenerating the mercury catalyst in the reaction liquid by the oxidizing action of an electric current in quantities of about one ampere-hour for about every 25 and more liters of acetylene which are conducted per hour into the reaction liquid.

3. In the manufacture of acetaldehyde from acetylene with aid of dilute acids containing a mercury compound, the method of regenerating the mercury catalyst in the reaction liquid by the oxidizing action of a relatively limited electric current in presence of an oxygen transmitter to aid the action of the electric current.

4. In the manufacture of acetaldehyde from acetylene with aid of dilute acids containing a mercury compound, the method of regenerating the mercury catalyst in the reaction liquid by the oxidizing action of an electric current in quantities of about one ampere-hour for about every 25 and more liters of acetylene which are conducted per hour into the reaction liquid containing an oxygen transmitter to aid the action of the electric current.

In witness whereof we have hereunto signed our names this fifth day of August 1918, in the presence of two subscribing witnesses.

EWALD STEINBUCH.
PAUL SCHETELIG.

Witnesses:
H. H. DICK,
AMAND RITTER.